United States Patent
Parker, Jr. et al.

(10) Patent No.: US 9,664,506 B2
(45) Date of Patent: May 30, 2017

(54) HIGH SPEED AND HIGH SPATIAL DENSITY PARAMETER MEASUREMENT USING FIBER OPTIC SENSING TECHNOLOGY

(71) Applicant: The United States of America as Represented by the Administrator of NASA, Washington, DC (US)

(72) Inventors: Allen R Parker, Jr., Lancaster, CA (US); Hon Man Chan, Canyon Country, CA (US); William Lance Richards, Palmdale, CA (US); Anthony Piazza, Palmdale, CA (US); Philip J Hamory, Lancaster, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 92 days.

(21) Appl. No.: 14/827,533

(22) Filed: Aug. 17, 2015

(65) Prior Publication Data

US 2017/0052020 A1 Feb. 23, 2017

(51) Int. Cl.
  *G01B 11/16* (2006.01)
  *G02B 6/02* (2006.01)
  *G02B 6/293* (2006.01)

(52) U.S. Cl.
  CPC .......... *G01B 11/165* (2013.01); *G02B 6/0208* (2013.01); *G02B 6/2938* (2013.01)

(58) Field of Classification Search
  CPC .............................. G01B 11/16; G02B 6/0208
  (Continued)

(56) References Cited

U.S. PATENT DOCUMENTS 6,404,956 B1 * 6/2002 Brennan, III ...... G02B 6/02138
  372/102
7,720,324 B2 * 5/2010 Haase ................... G01L 1/246
  385/13
(Continued)

FOREIGN PATENT DOCUMENTS

WO   WO/2013/003141   1/2013

OTHER PUBLICATIONS

Fei Wu et al., "Study of Fiber Bragg Grating Sensor System Based on OFDR/WDM", Proc. SPIE 6150, 2nd International Symposium on Advanced Optical Manufacturing and Testing Technologies: Optical Test and Measurement Technology and Equipment, 615022 (May 19, 2006).

*Primary Examiner* — Roy M Punnoose
(74) *Attorney, Agent, or Firm* — Mark Homer

(57) ABSTRACT

The present invention is an improved fiber optic sensing system (FOSS) having the ability to provide both high spatial resolution and high frequency strain measurements. The inventive hybrid FOSS fiber combines sensors from high acquisition speed and low spatial resolution Wavelength-Division Multiplexing (WDM) systems and from low acquisition speed and high spatial resolution Optical Frequency Domain Reflection (OFDR) systems. Two unique light sources utilizing different wavelengths are coupled with the hybrid FOSS fiber to generate reflected data from both the WDM sensors and OFDR sensors operating on a single fiber optic cable without incurring interference from one another. The two data sets are then de-multiplexed for analysis, optionally with conventionally-available WDM and OFDR system analyzers.

15 Claims, 4 Drawing Sheets

(58) Field of Classification Search
USPC .......................................................... 356/32
See application file for complete search history.

(56) References Cited

U.S. PATENT DOCUMENTS

| | | | | |
|---|---|---|---|---|
| 8,050,523 B2* | 11/2011 | Younge | ................ | A61B 5/1076 385/13 |
| 8,120,759 B2* | 2/2012 | Olesen | ................ | G01M 5/0041 290/44 |
| 8,278,929 B2* | 10/2012 | Summerfield | ......... | G01V 3/083 324/334 |
| 8,310,657 B2* | 11/2012 | Olesen | ................ | G01M 5/0041 290/44 |
| 8,503,834 B2* | 8/2013 | Arkwright | .............. | G01L 1/246 385/13 |
| 8,515,215 B2 | 8/2013 | Younge et al. | | |
| 8,909,040 B1* | 12/2014 | Parker, Jr. | ................ | G02B 6/35 398/25 |
| 8,970,845 B1* | 3/2015 | Chan | ...................... | G01M 11/30 356/478 |
| 9,009,003 B1* | 4/2015 | Chan | .................. | G01D 5/35316 356/477 |
| 9,442,004 B2* | 9/2016 | Glavind | .................. | F03D 9/002 |
| 2002/0028034 A1* | 3/2002 | Chen | ....................... | G01L 1/242 385/12 |
| 2008/0285909 A1* | 11/2008 | Younge | ................ | A61B 5/1076 385/13 |
| 2009/0129722 A1* | 5/2009 | Hao | ................... | G01D 5/35383 385/13 |
| 2009/0184715 A1* | 7/2009 | Summerfield | ......... | G01V 3/083 324/334 |
| 2011/0080591 A1 | 4/2011 | Johnson et al. | | |
| 2013/0016360 A1 | 1/2013 | Ensher et al. | | |
| 2013/0085330 A1* | 4/2013 | Ramamurthy | ........... | A61B 5/06 600/117 |

* cited by examiner

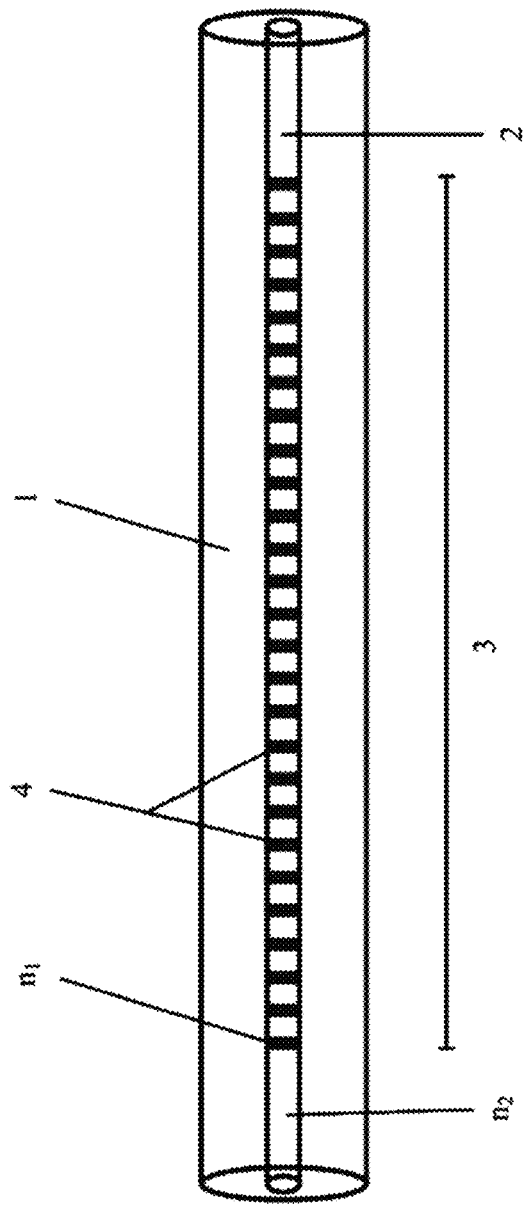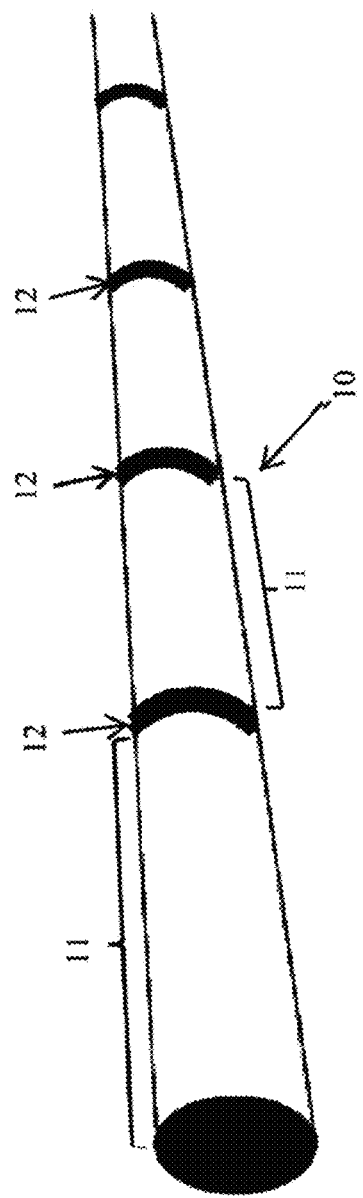
FIG. 1 - Prior Art
FIG. 2

HIGH SPEED AND HIGH SPATIAL DENSITY PARAMETER MEASUREMENT USING FIBER OPTIC SENSING TECHNOLOGY

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND a. Field of Invention

The invention relates to strain sensing technology and, more particularly, to a hybrid fiber optic sensing system (FOSS) for high spatial resolution and high frequency strain sensing measurements.

b. Background of the Invention

The prediction and monitoring of the strains acting on a vehicle or structure during its operation are important engineering tools that have the ability to greatly improve vehicle or structure safety and performance. Fiber optic sensors represent some of the most mature technology for obtaining active environment measurements such as strain and temperature. FOSS technology is particularly suited for aerospace applications in that the sensors are lightweight, accurate within a wide temperature range, and immune to electromagnetic and radio-frequency interference and radiation. FOSS-based sensors therefore have a relatively long lifespan, especially as compared to conventional foil strain gage sensors, and may be embedded into the composite structure of an aircraft or other vehicle or into a stationary structure during manufacturing to optimally measure active strain data during the lifespan of the system. Also, due to these sensors' wide range of elasticity under environmental perturbation, they may be used for failure testing during the design phase of a vehicle or structure to ascertain the limits of the system in operation.

One conventional type of fiber optics-based sensor is known as the Fiber Bragg Grating (FBG or "Bragg grating"). When incorporated into an optical fiber, an FBG reflects particular wavelengths of light based on its Bragg wavelength, an inherent characteristic of the FBG for a given mode. Strain or certain other forces acting on the fiber and thus on the FBG will alter the reflected wavelength. The characteristics of the reflected light can thus be analyzed to determine the strain characteristics of the fiber, with data points corresponding to the discrete locations of the Bragg gratings.

A representative FBG is depicted in FIG. 1. Fiber 1 has a core 2, typically made of silica and having a refractive index $n_2$. The FBG is represented by area 3 comprising a plurality of individual index variations 4, shown in shading along core 2. Each index variation 4 has been modified by UV light or the like to alter its refractive index to $n_1$. As described below, a single fiber may have multiple FBGs along its core 2. Light traveling along core 2 and passing through FBG 3 is partially reflected at each index variation 4. Where light has the characteristic Bragg wavelength of a given FBG, reflections at each index variation 4 are propagated back down the fiber. The grating period refers to the layout and spacing of the index variations 4.

Fiber optic sensing technology to measure parameter data conventionally falls into one of two categories: Optical Frequency Domain Reflection (OFDR) and Wavelength-Division Multiplexing (WDM). In a WDM sensor array system, a source emits a light covering a selected wavelength range. The light is coupled into the fiber containing an array of serially multiplexed sensor gratings, each having a different Bragg wavelength. The WDM system is designed so that the Bragg wavelengths of each sensor are separated from one another by a certain wavelength range so that the FBGs don't interfere with each other. However, the wavelength range of reflections from a given FBG combined with the finite bandwidth of the light source means that only a limited number of FBGs can be used in a single fiber, thus limiting the spatial resolution of strain measurements in a WDM system. WDM systems typically have relatively high sample rates in terms of kHz ranges.

By contrast, OFDR allows for a much higher number of gratings per fiber (thousands of gratings per fiber are permitted) but is characterized by a much lower sample rate (i.e., less than 100 Hz) than WDM. Thus, with OFDR, higher spatial resolution is available but is acquired much less frequently. In an OFDR system, all of the FBGs in a single fiber have the same central wavelength, and their positions and characteristics along the fiber are detected by measuring the beat frequency of an individual grating's reflection against the reflection from a reference arm of an interferometer having a known length. Because only a narrow band of light is supplied, an optical fiber in an OFDR system can effectively be "continuously grated" with FBGs having similar characteristics. However, current technology limitations prevent OFDR systems from having a high sample rate and therefore applications for OFDR systems are limited to lower frequency applications.

FOSS technology based on OFDR has a wide range of applications. Applications include the use of FOSS sensors on commercial and non-commercial aeronautics and Aero-Structures, on rotary blades for helicopters and other rotorcraft, on high performance automobiles and/or in the racing industry, and in the fields of civil and mechanical engineering to measure strains on bridges, buildings, wind turbines, and the like. In aerospace applications, strain sensing technology must be lightweight and have a small footprint, both in terms of the sensor array and the analytics technology, it must be able to be securely attached to or embedded in the structure of the aircraft, and it must function across a wide temperature range.

The ability of engineers to capture structural strain measurements during high frequency shock and/or vibration events would enable better modeling of the structural capacities of a structure during extreme conditions, to predict the fatigue of the structures during normal operating conditions, and to gain other important information about the system in operation or at failure. High frequency sampling (1 kHz or more) is necessary to capture such measurements. However, it is also necessary to maintain the spatial resolution available under low-frequency methods like OFDR.

Therefore, it would be advantageous to provide an optical strain sensing system for the active capture of strain sensing data which provided both a high spatial resolution and a high frequency rate of measurement. It would also be desirable to provide such a system in a single, integrated unit that is capable of receiving and processing both high frequency and high spatial resolution strain data in real time. In addition, it would be advantageous for this system to be able to interface with conventional strain sensing analytics technologies.

SUMMARY OF THE INVENTION

It is, therefore, an object of the present invention to provide a fiber optic sensing system that provides both high spatial resolution and high frequency measuring capabilities. It is another object of the present invention to provide both high resolution and high frequency capabilities within a single continuously grated fiber that maintains the low weight and low profile of modern WDM and OFDR systems.

The present inventors herein provide a hybrid fiber optic cable capable of generating both high frequency and high resolution strain measurement types. The inventive hybrid fiber contains both WDM FBGs (typically 1310 nm) and OFDR FBGs (typically 1550 nm) from which discrete readings using two different light sources are obtainable. The two types of gratings are spaced at different intervals along the length of the fiber such that the OFDR FBGs are densely spaced along the length of the fiber to function as an OFDR system cooperatively with its unique light source and the WDM FBGs are relatively sparsely spaced to function as a WDM system cooperatively with its unique light source. Light sources are selected to correspond with the central wavelength and overall bandwidth of each type of optical strain sensing system and both light sources are coupled to the same hybrid fiber optic cable. The reflected information is then de-multiplexed into separate light components and analyzed separately. The two independent data sets are then fused together, recorded and then transmitted to a computer where they are received and displayed.

In a preferred embodiment, the hybrid fiber according to the present invention occupies one of eight available fiber channels on a conventional FOSS interrogation unit. This allows the entire system to comprise a single 8-fiber fiber optic strand and a single interrogation unit.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

FIG. 1 is a side cut-away view of a conventional fiber Bragg grating.

FIG. 2 is a perspective view of the hybrid Fiber Optic Sensing System (hyFOSS) fiber 10 according to the present invention on which shading variants represent areas of different grating patterns on the core of fiber 10.

DETAILED DESCRIPTION OF THE PREFERRED EMBODIMENTS

Figure 3:
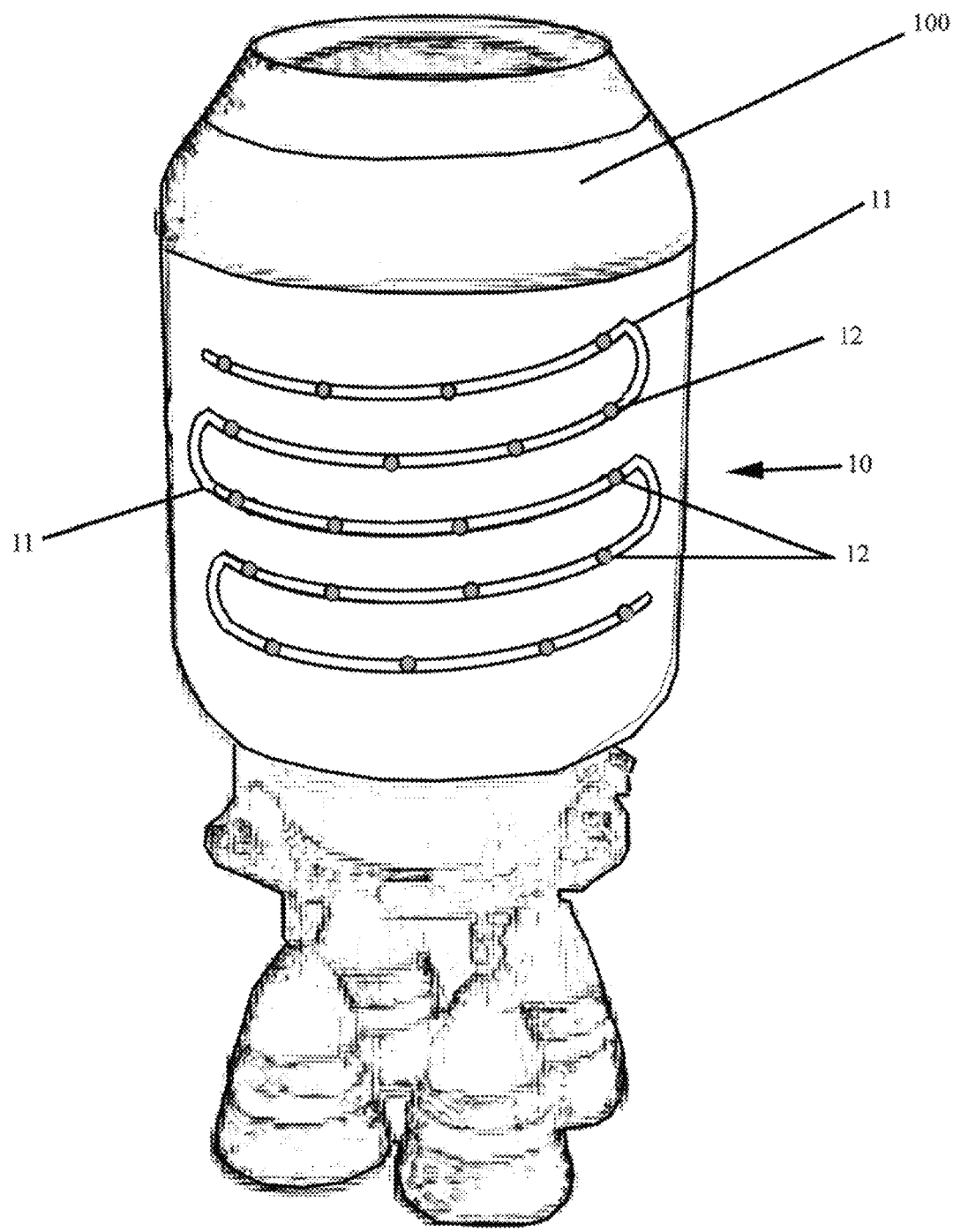
FIG. 3 depicts the layout of the hyFOSS fiber 10 according to the present invention as applied to a representative aerospace vehicle 100.

The present invention is an improved fiber optic strain sensing system through which both high spatial resolution and high frequency strain measurements are provided on a single hybrid fiber.

The combination of high spatial resolution and high frequency measurements on a single fiber is accomplished by the inventive fiber onto which OFDR FBGs and WDM FBGs are incorporated, herein termed a hybrid FOSS or "hyFOSS" fiber. The characteristics of the FBGs are selected to match the wavelengths transmitted by two discrete light sources. In a preferred embodiment, both a 1310 nm broadband light source 20 and a 1550 nm tunable light source 30 are both coupled onto the hyFOSS fiber as described in further detail below.

FIG. 2 is a perspective view of the hyFOSS fiber 10 according to the present invention with areas of different grating patterns on the core of fiber 10, including areas of densely spaced fiber Bragg gratings, and areas of sparsely spaced fiber Bragg gratings. Areas 11 represent locations of the fiber onto which densely spaced OFDR (1550 nm) FBGs are inscribed onto the fiber's core (not shown). Darkly shaded bands 12 represent the locations of WDM (1310 nm) FBGs that serve as WDM sensors. In a preferred embodiment of the present invention, "densely spaced" means OFDR sensors spaced no more than ¼ in. apart with little to no gap between gratings.

By way of example, for a WDM sensor array light source having a bandwidth of 70 nm, and wherein the Bragg wavelengths of all WDM sensors are separated by 2 nm for interference avoidance, a maximum of 35 sensors may be used for the WDM sensor array on a single fiber. For a representative 80 ft. FOSS sensor, then, WDM sensors 12 would be located approximately every 27 inches along the length of the fiber. By contrast, OFDR sensors 11, which operate within the same central wavelength, may be densely spaced between WDM sensors 12 along the length of the fiber 10. According to one embodiment of the present invention, a single fiber may contain 4,096 OFDR sensors 11, spaced approximately every ¼ in. along fiber 10. However, these parameters are not meant to be limiting, and it will be understood that the number and spacing of WDM and OFDR sensors can be varied within the technological constraints discussed herein, to suit the desired application. For example, as described in more detail below, a number of WDM sensors can be concentrated along a short length of hyFOSS fiber 10 and placed on the structure being measured in places where the structure is expected to experience exceptionally large or unique forces.

The hyFOSS technology according to the present invention can be applied to any industry where high spatial resolution shape and/or strain measurements and high speed acquisition of parameter measurements are desired. Based upon the application, hyFOSS fiber 10 could be strategically located on the structure to be measured in areas of expected high strain or on particularly strain-sensitive areas like, for example, the leading edge of an aircraft wing. Moreover, WDM sensors 12 need not be equally spaced along the length of hyFOSS fiber 10 and can be clustered on a particular area of fiber 10 such that, when fiber 10 is applied to the structure, WDM sensors 12 are able to measure, up to 5 kHz, a particularly sensitive area of the structure or an area of greatest interest to the engineers, or the like.

FIG. 3 depicts the layout of the hyFOSS fiber 10 according to the present invention as applied to a representative aerospace vehicle 100. As in FIG. 2, unshaded areas 11 in FIG. 3 represent areas of densely spaced OFDR sensors while WDM sensors 12 are shown at spaced intervals along fiber 10. Fiber 10 is depicted as applied to the surface of the vehicle's outer structure for illustration purposes, but it will be understood that the FOSS sensor system according to the present invention may be either partially or fully embedded in the composite material comprising the external structure or any internal structure of vehicle 100 for which high frequency, high resolution strain sensing data is desired. Moreover, the FOSS sensor system may be wrapped fully around, affixed to or embedded in any configuration on or into the vehicle or structure being measured. FIG. 3 depicts a single hyFOSS fiber according to the present invention as applied to a representative aerospace vehicle 100. However, as described in more detail below, hyFOSS fiber 10 may actually be incorporated into a unitary fiber optic strand comprising multiple individual fibers either in parallel with or affixed to or embedded in other regions of the structure being measured. The FOSS sensors system, including hyFOSS cable 10, is coupled to an interrogation system (not shown in FIG. 3) to collect and analyze the reflected data and which, in an aircraft, may reside inside the vehicle and be provided with a screen for viewing measured strain data of the aircraft in real time.

Figure 4:
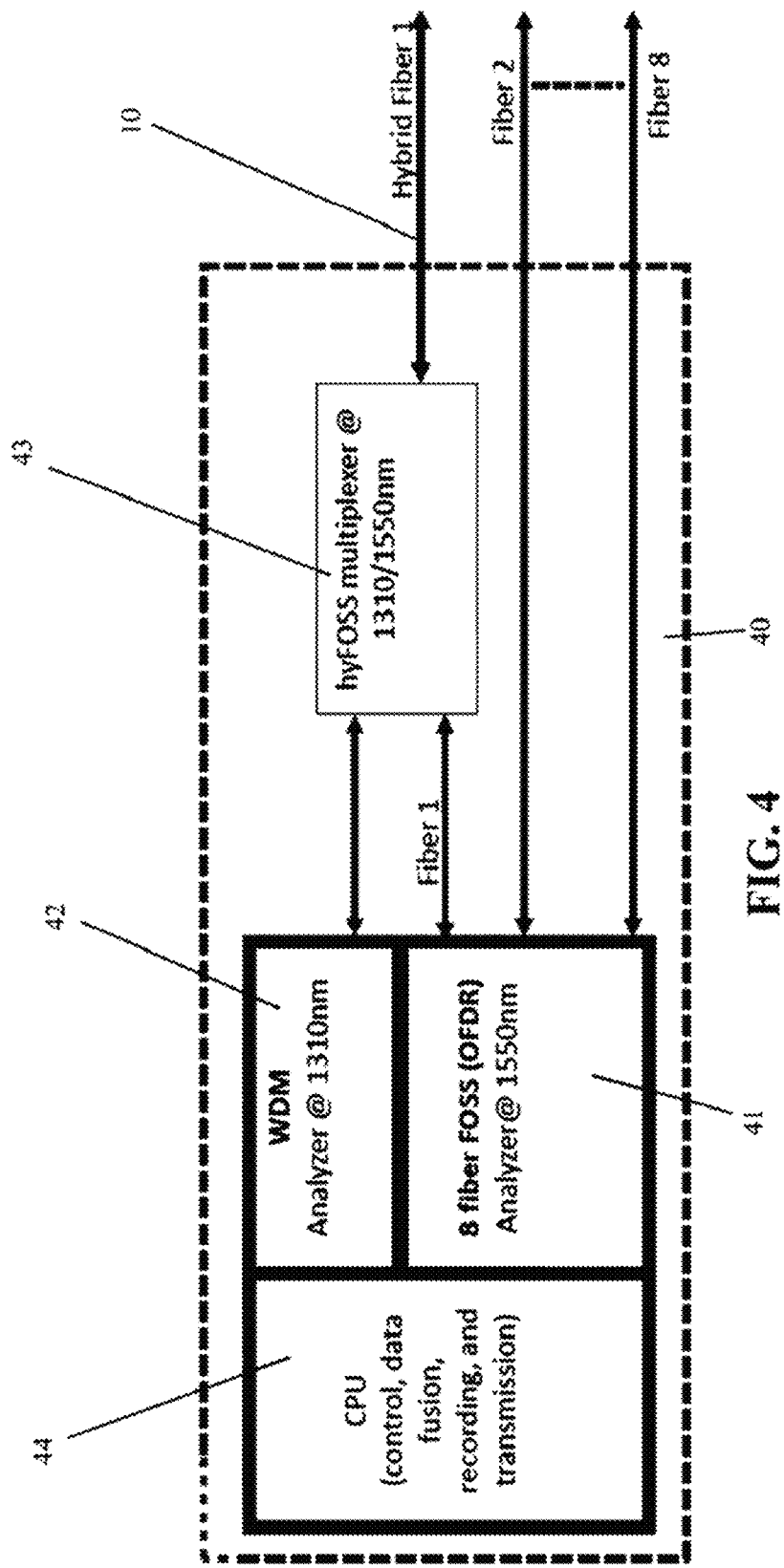
FIG. 4 is a block diagram of the hyFOSS interrogation system according to the present invention.

FIG. 4 is a block diagram of the inventive hyFOSS interrogation system which allows signals from both sensor types (WDM and OFDR) along the same hyFOSS fiber 10 to be interrogated and analyzed. hyFOSS interrogation system 40 comprises both an OFDR analyzer 41 and a WDM analyzer 42. In a preferred embodiment, OFDR analyzer 41 comprises an 8-fiber FOSS analyzer, but alternatively may be any OFDR analyzer known in the art or subsequently developed. Both OFDR analyzer 41 and WDM analyzer 42 contain a light source. In a preferred embodiment, WDM analyzer 42 contains a 1310 nm broadband light source with a 70 nm bandwidth for supplying light in the proper wavelength range for reflection by the plurality of WDM sensors 12 located along hyFOSS fiber 10. OFDR analyzer 41 preferably contains a 1550 nm tunable light source for emitting light for reflection by the plurality of OFDR sensors 11 located along hyFOSS fiber 10. In addition, according to one embodiment of the instant invention, OFDR analyzer 41 may be coupled to additional, non-hyFOSS fibers occupying the same fiber strand as one or more hyFOSS fibers 10.

hyFOSS interrogation system 40 additionally contains hyFOSS multiplexer 43 that accomplishes the multiplexing and de-multiplexing required for hyFOSS fiber 10. As shown in FIG. 4, hyFOSS multiplexer 43 receives light from both the WDM 42 and OFDR 41 analyzer light sources. Thus, in the preferred embodiment, hyFOSS multiplexer 43 receives light at 1310 nm wavelength and at 1550 nm wavelength. hyFOSS multiplexer 43 functions similarly to an add-drop multiplexer by combining the light received from both light sources at 1310 nm and 1550 nm, then feeds the combined signal into hyFOSS fiber 10.

As described above, hyFOSS fiber 10 contains both WDM and OFDR sensors wherein each separate sensor type is configured to reflect a given bandwidth of light. Thus, light at 1310 nm is reflected by the plurality of WDM sensors and light at 1550 nm is reflected by the plurality of OFDR sensors. Reflections are received by hyFOSS multiplexer 43, which then de-multiplexes the signal by separating the reflected light into its respective components (1550 nm and 1310 nm) for interrogation by their respective analyzers 41, 42. Incorporated with WDM 42 and OFDR 41 analyzers in hyFOSS interrogation system 40 is a CPU 44 which fuses the data sets received by the two analyzers 41, 42 and, optionally, records and/or transmits the fused and/or independent data sets based on design preference and desired means of data capture. CPU 44 and/or hyFOSS interrogation system 40 also optionally contain a display unit (not shown) for interactive viewing and/or to enable manipulation of the data received from the sensor array.

Figure 5:
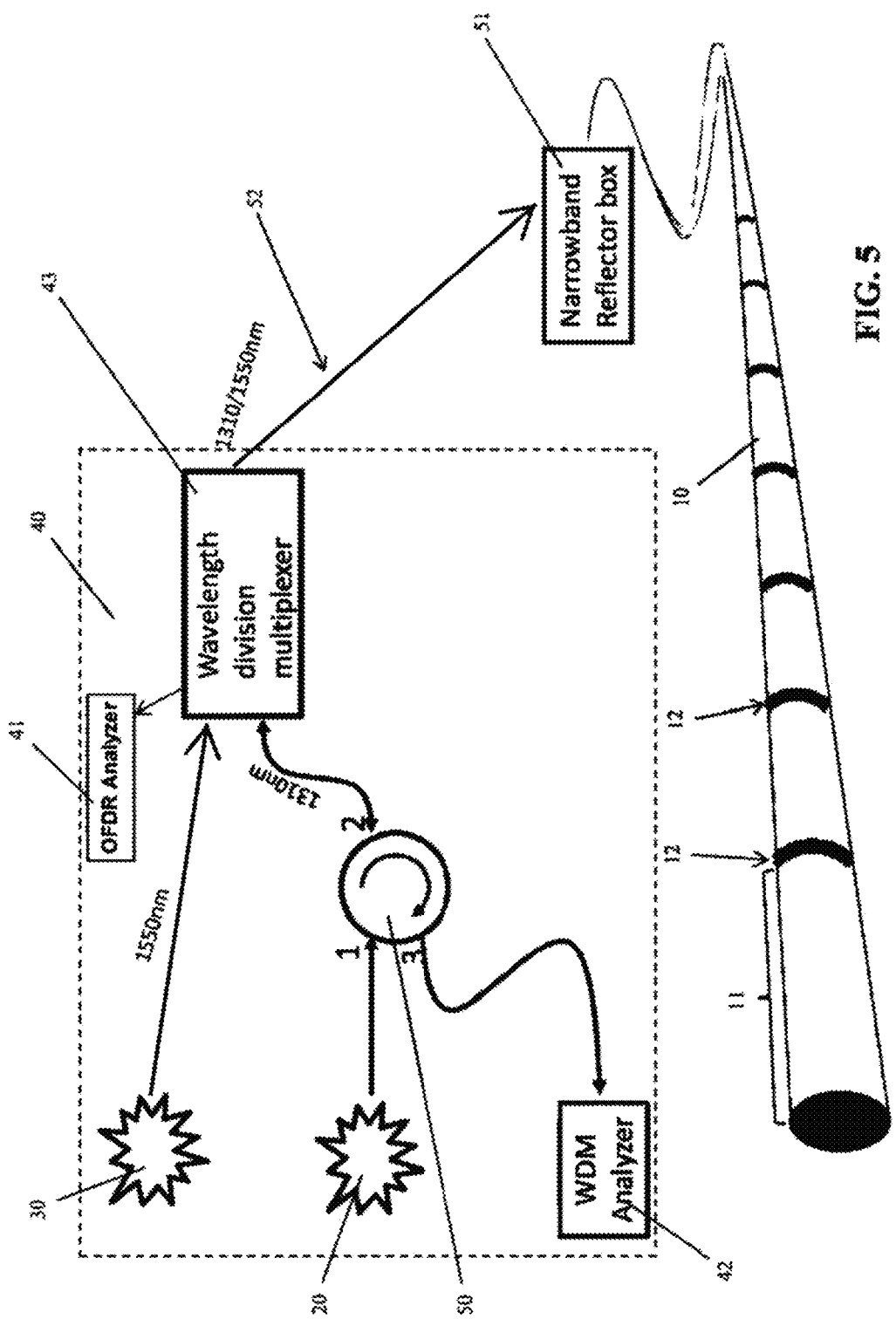
FIG. 5 is a schematic diagram of the FOSS system according to the present invention including a single representative hyFOSS fiber 10.

FIG. 5 is a schematic diagram of the FOSS system including a single representative hyFOSS fiber 10. Box 40 encapsulates components of the hyFOSS interrogation system. In operation, light from both a 1550 nm tunable light source 30 and a 1310 nm broadband light source 20 are fed into wavelength-division multiplexer 43. Optionally, a 3-port circulator 50 may be used to apply signals to and from 1310 nm broadband light source 20, multiplexer 43 and WDM analyzer 42 as shown. 3-port circulator 50 facilitates the transmission of light from 1310 nm broadband light source 20 to multiplexer 43 and of reflection data from multiplexer 43 to WDM analyzer 42 as will be described. Multiplexer 43 then multiplexes light from both light sources 20, 30 for transmission to hyFOSS fiber 10. Transmission between multiplexer 43 and hyFOSS fiber 10 may be accomplished via a standard optical patch cable 52, as shown. The multiplexed light comprising wavelengths from both light sources 20, 30 is then fed into hyFOSS fiber 10 and reflections from WDM sensors 12 and OFDR sensors 11 are received back at the multiplexer 43.

Optionally, a narrowband reflector box 51 comprising a chirped FBG with 50% reflectivity at 1550 nm and an 80 nm bandwidth is connected between hyFOSS fiber 10 and multiplexer 43 and/or optical cable 52. A narrowband reflector box 51 configured in this fashion will reflect 50% of the light having a wavelength of (and within 80 nm of) 1550 nm and pass all light having a wavelength of approximately 1310 nm.

Multiplexer 43 receives the reflected light from the hyFOSS fiber containing both WDM 12 and OFDR 11 sensor types. Multiplexer 43 then de-multiplexes, i.e. separates, the reflected light into its respective components (1310 nm and 1550 nm) and transmits each separate component to its respective analyzer 41, 42. Although not shown, multiplexer 43 may also be connected to 1550 nm light source 30 and OFDR analyzer 41 via a 3-point circulator for efficiency of transmission. With reference now to FIG. 4, a CPU 44 collects and fuses the data sets from the respective analyzers 41, 42 and records and/or transmits and/or displays same as described above.

Although the inventive system and hyFOSS fiber is described herein with respect to a 1550 nm OFDR sensor system and corresponding light source and a 1310 nm WDM sensor system and corresponding light source, it should be understood to one having ordinary skill in the art that the invention may be adapted to utilize light having different wavelengths by modification of the grating periods of WDM 12 and OFDR 11 sensors, with modification and/or tuning of light sources 20, 30 and with minimal additional adjustment to hyFOSS interrogator 40. In addition, it should be understood that a FOSS system may include one or more hyFOSS fibers according to the present invention, which may be combined in a fiber optic strand with one or more traditional FOSS sensors such as one or more traditional OFDR sensors and/or one or more traditional WDM sensors, with minor alteration to the system as disclosed in FIG. 4. Moreover, the total number and total length(s) of each sensor adapted for use with the hyFOSS interrogator may vary based on design choice and space limitations in terms of both sensor placement and the interrogator system itself. For example, the hyFOSS interrogation system 40 as depicted in FIG. 4 may be adapted for use with a traditional OFDR analyzer having more than 8 fiber channels.

One skilled in the art should now understand that the above-described system is an improvement over conventional WDM and OFDR FOSS systems as it provides strain measurements at both a high spatial resolution and a high frequency. The system may be modified for cooperative use with a wide range of systems requiring active or experimental strain measurements, such as bridges and automobiles, and may be adapted to provide high spatial resolution and high frequency strain measurements along areas of interest to the engineer. The inventive system may also be easily integrated into an existing WDM or OFDR FOSS system.

It should be understood that various changes may be made in the form, details, arrangement, and selection of the components. Such changes do not depart from the scope of the invention which comprises the matter shown and described herein and set forth in the appended claims.

The invention claimed is:

1. A hybrid fiber optic strain sensor, comprising:
a first plurality of densely spaced fiber Bragg gratings, each of said first plurality of densely spaced fiber Bragg gratings having a first resonant wavelength; and
a second plurality of fiber Bragg gratings, spaced at intervals for WDM interrogation, each of said second plurality of fiber Bragg gratings having a second resonant wavelength domain;
wherein said first resonant wavelength comprises 1550 nm and second resonant wavelength domain comprises 1310 nm plus or minus 70 nm.

2. A fiber optic strain sensing system, comprising:
at least one hybrid fiber optic strain sensor as claimed in claim 1;
a first light source;
a second light source;
a multiplexing device operably coupled between said at least one hybrid fiber optic sensor on a first side and said first and second light sources on a second side, said multiplexer being configured to multiplex light from said first and second light sources and to de-multiplex reflections from said at least one hybrid fiber optic sensor;
a first signal analyzer operatively coupled to said multiplexing device; and
a second signal analyzer operatively coupled to said multiplexing device.

3. The fiber optic strain sensing system of claim 2, wherein said first signal analyzer is a WDM analyzer.

4. The fiber optic strain sensing system of claim 2, wherein said second signal analyzer is an 8 fiber OFDR analyzer.

5. The fiber optic strain sensing system of claim 4, further comprising 7 additional FOSS fibers operatively coupled to said second signal analyzer.

6. The fiber optic strain sensing system of claim 2, further comprising a narrowband reflector box operatively connected between said at least one hybrid fiber optic strain sensor and said multiplexing device.

7. The fiber optic strain sensing system of claim 2, further comprising a 3-point circulator operatively coupled between said first light source, said first signal analyzer, and said multiplexing device.

8. The fiber optic strain sensing system of claim 7, further comprising a 3-point circulator operatively coupled between said second light source, said second signal analyzer, and said multiplexing device.

9. The fiber optic strain sensing system of claim 2, wherein said at least one hybrid fiber optic strain sensor is at least partially embedded into the structure of a vehicle.

10. The fiber optic strain sensing system of claim 9, wherein said at least one hybrid fiber optic strain sensor is fully embedded into the structure of a vehicle.

11. The fiber optic strain sensing system of claim 10, wherein said vehicle is an aircraft, and further comprising a CPU having a monitor mounted in the cabin of said aircraft, said CPU being operatively connected to said first and second signal analyzers.

12. The fiber optic strain sensing system of claim 2, wherein said at least one hybrid fiber optic strain sensor is at least partially embedded into the structure of a structure selected from the group comprising a rotorcraft blade, bridge, building, or wind turbine.

13. A fiber optic strain system, comprising:
a hybrid fiber optic strain sensor, comprising:
a first plurality of fiber Bragg gratings, each of said first plurality of fiber Bragg gratings having a first resonant wavelength; and
a second plurality of fiber Bragg gratings, each of said second plurality of fiber Bragg gratings having a second resonant wavelength domain;
wherein said first resonant wavelength and second resonant wavelength domain are not equal;
a multiplexer configured to de-multiplex reflections from said at least one hybrid fiber optic sensor such that reflections from said first plurality of fiber Bragg gratings are separated from said second plurality of fiber Bragg gratings: and,
a narrowband reflector box operatively connected between said at least one hybrid fiber optic strain sensor and said multiplexing device.

14. The fiber optic strain sensing system of claim 13, wherein said at least one hybrid fiber optic strain sensor is at least partially embedded into the structure of a vehicle.

15. The fiber optic strain sensing system of claim 14, wherein said first resonant wavelength is longer than said second resonant wavelength domain, and wherein said second plurality of fiber Bragg gratings are physically concentrated along a portion of said structure of said vehicle expected to experience large or unique forces.

* * * * *